May 26, 1964  P. P. KISLIUK ETAL  3,134,837
OPTICAL MASER
Filed Oct. 16, 1961

INVENTORS P. P. KISLIUK
D. A. KLEINMAN
BY
ATTORNEY

United States Patent Office 3,134,837
Patented May 26, 1964

---

3,134,837
OPTICAL MASER
Paul P. Kisliuk, Morristown, and David A. Kleinman, Plainfield, N.J., assignors to Bell Telephone Laboratories, Incorporated, New York, N.Y., a corporation of New York
Filed Oct. 16, 1961, Ser. No. 145,087
3 Claims. (Cl. 88—1)

This invention relates to optical masers and, more particularly, to cavity resonators for use in such devices.

The recent invention of the optical maser has made possible the generation and amplification of coherent electromagnetic waves in the optical frequency range. This range is generally considered to extend from the farthest infrared portion of the spectrum through the ultraviolet. Due to the extremely high frequencies associated with wave energy in this range, the coherent waves produced by optical maser devices are capable of transmitting enormous quantities of information. Thus, the resulting extension of the usable portion of the electromagnetic spectrum has greatly increased the number of frequency channels available for communication and other uses.

As developed for use at microwave frequencies, masers typically comprise a negative temperature medium which is contained in a cavity resonator having a single resonant mode near the frequency at which stimulated emission is to be produced. The design of such cavity resonators for microwaves is a relatively simple matter, typical structures having dimensions on the order of a single wavelength at the chosen frequency. The application of this design approach to optical masers is impractical, however, due to the extremely small wavelengths involved. It has been necessary, therefore, to design optical cavity resonators having dimensions which may be thousands of times larger than the wavelength of signals at the operating frequency.

One such structure which has been employed successfully for the specified purpose is the Fabry-Perot interferometer comprising two plane parallel reflective surfaces separated by a gap of convenient length. The active medium of the maser is located in the gap between the reflective surfaces, at least one of which is partially transmissive to permit coupling the device to an external utilization circuit. An optical maser of this type is described in U.S. Patent 2,929,922 to Schawlow and Townes.

Optical cavity resonators, being of necessity much larger than the wavelengths employed therewith, are inherently multimode devices. A mathematical analysis of the mode system in a Fabry-Perot resonator having reflecting end surfaces may be found in an article by Fox and Li in the Bell System Technical Journal, vol. 40, page 453. Fox and Li have shown that the resonator may be characterized by a number of axial and off-axial modes having very low losses. In a device having the configuration analyzed in the above-mentioned article, losses are the same in all axial modes. Thus, no axial mode is preferred and several may be excited simultaneously.

The presence of many modes in a maser adapted for communication purposes, however, is disadvantageous. For example, significantly more power is required by a multimode than a single mode maser device to produce the desired well defined output line which stands out clearly from the background emission. Furthermore, the excitation of many modes has an adverse effect on the stability of the maser, an important consideration in communications systems.

It is an object of this invention to provide an optical maser cavity resonator having a mode system which includes a relatively few preferred modes among a plurality of resonant modes.

It is also an object of this invention to increase the losses of certain modes in the cavity resonator of an optical maser, relative to other preferred modes therein.

These and other objects of the invention are achieved in one specific illustrative embodiment thereof comprising two spaced flat parallel reflective surfaces defining the ends of an optical cavity resonator, and a third flat reflective surface intermediate the end surfaces and parallel thereto. The third reflective surface divides the overall cavity into two smaller gaps, one of which contains the negative temperature medium. Thus, in the first illustrative embodiment three axially spaced parallel reflective surfaces define two gaps, one of which contains the active medium.

In a second embodiment illustrative of the principles of the invention four axially spaced flat parallel reflective surfaces define an optical cavity resonator of three gaps. In this embodiment the negative temperature medium is advantageously contained in the center gap.

It is a feature of the invention that the reflective surface or surfaces interior to the overall cavity defined by the two end reflective surfaces are partially transmissive to light at the operating frequency of the maser.

It is also a feature of the invention that at least one of the two end reflective surfaces defining the overall cavity is partially transmissive. It may be desirable in some instances that both end reflective surfaces be partially transmissive. Such possibility is also in accordance with the invention.

It is a further feature of the invention that at least one end reflective surface of the cavity, which defines one end of a gap therein, has a reflectivity at least as great as that of the interior reflective surface defining the other end of the same gap.

The above-mentioned and other objects and features of the invention will be better understood from the following more detailed discussion taken in conjunction with the accompanying drawing, in which.

Figure 1:
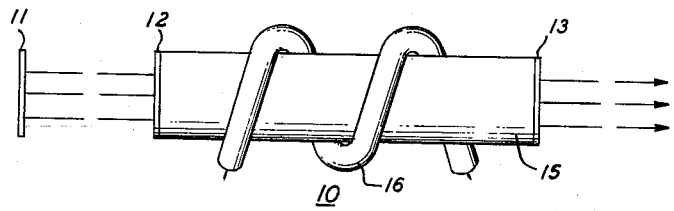
FIG. 1 depicts a first illustrative optical maser embodying the principles of the invention.

The optical maser 10 shown in FIG. 1 comprises an optical cavity resonator formed by three axially spaced flat parallel reflective surfaces 11, 12 and 13. An active maser medium in the form of a rod 15 is disposed within the cavity in the gap between reflective surfaces 12 and 13, while the gap between surfaces 11 and 12 contains a substantially transparent inert medium such as air or a vacuum. The surfaces 12 and 13 may be formed by evaporating thin films of silver or other reflective substance directly onto flat ends of the rod 15. A lamp 16, connected to a power source, not shown, is arranged about the rod 15 for supplying pump wave energy thereto. Maser action is initiated when the pump power produces a population inversion in the energy level system of rod 15.

Optical masers of the type hitherto known, employing the Fabry-Perot interferometer as a resonant cavity, are characterized by a number of resonant modes some of which it is desired to suppress. Such modes tend to degrade the performance of the maser and are troublesome whenever the fluorescent emission of the device covers a frequency band wider than about $(2nd)^{-1}$ wave numbers, where $n$ is the refractive index of the active medium filling the cavity and $d$ is the distance between the reflective ends thereof. It is believed that these modes are the cause of several types of fine structure which has been observed in the output beams of optical masers whose operation has been reported in the literature. Decreasing $d$ is not a satisfactory way of avoiding the unwanted modes from the output, primarily because this would also decrease the amount of active material in the maser and, hence, decrease the gain of the device.

Mode suppression is achieved in the optical maser 10 by adding an additional reflective surface to the priorly known Fabray-Perot resonator structure. Thus, in the device shown in FIG. 1, the reflective surfaces 12 and 13 are partially transmissive to light at the operating frequency, while the surface 11 is totally reflective. The addition of another reflective surface to the resonator structure effectively discriminates against the undesirable modes of the basic two-surface resonator by increasing their losses relative to the losses in other modes. In general, the desired result is achieved when the length of the empty gap between surfaces 11 and 12 is less than that of the gap between surfaces 12 and 13. Optimum discrimination is obtained in the optical maser 10 when the empty gap is about equal to $(2\Delta\nu)^{-1}$ where $\Delta\nu$ is the half-width of the fluorescent emission line.

Figure 2:
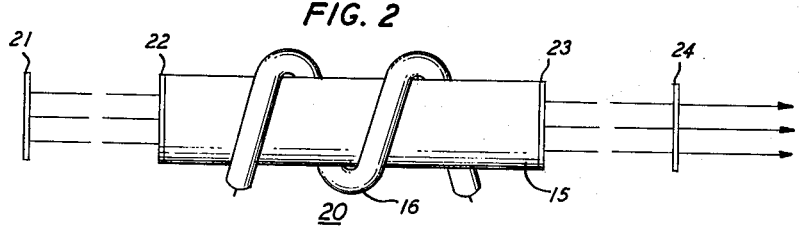
FIG. 2 depicts a second optical maser embodying the invention.

The invention is not limited to the embodiment shown in FIG. 1 but may also be applied, for example, to an optical maser of the type illustrated in FIG. 2. The maser 20 depicted therein comprises spaced parallel reflective surfaces 21, 22, 23 and 24. The overall optical cavity resonator is defined by end reflective surfaces 21 and 24, at least one of which is partially transmissive to light at the operating wavelength of the device. The reflective surfaces 22 and 23 are partially transmissive and, in conjunction with surfaces 21 and 24, define three interior gaps of the resonator. The active maser medium, in the form of a rod 15, is located in the center gap between surfaces 22 and 23.

In accordance with one feature of the invention each reflective end surface of the optical cavity which also defines one end of an empty gap therein, has a reflectivity which is at least as great as that of the interior reflective surface forming the other end of the same empty gap. Thus, in the optical maser 10 shown in FIG. 1 the surface 11 is totally reflective and so has a reflectivity greater than that of the interior surface 12, which is partially transmissive. It is to be noted, however, that the mode discriminating characteristics of the invention are not enhanced by making the surface 11 more reflective than the surface 12. Optimum conditions for mode discrimination require that the surface 11 be at least as reflective as the surface 12, but other considerations will determine whether or not its reflectivity exceeds that of surface 12.

In the optical maser 20 depicted in FIG. 2, reflective surfaces 21 and 24 define the overall cavity. Empty gaps are defined by surfaces 21 and 22, and by surfaces 23 and 24. The surface 21 is totally reflective while surface 22 is partially transmissive to light of the operating frequency. Thus, the reflectivity of the surface 21 is at least equal to that of the surface 22, as required by the invention. At the other end of the maser 20, both reflective surfaces 23 and 24 are partially transmissive. In accordance with the invention, however, the reflectivity of the end surface 24, which defines one end of an empty gap, is at least as great as the reflectivity of the surface 23.

Figure 3:
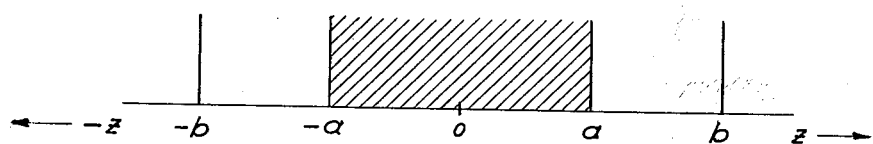
FIG. 3 is a schematic diagram illustrating the invention.

The properties of the invention may be understood by referring to FIG. 3, which is a two-dimensional schematic representation of an optical maser having four reflective surfaces. The active medium, indicated by the shaded area at $-a \leqslant z \leqslant a$, is characterized by a real dielectric constant $\epsilon > 1$ and a real conductivity $\sigma$. For $|z| > a$ it is assumed that $\epsilon = 1$ and $\sigma = 0$. Reflective surfaces are placed at $z = \pm a$, $\pm b$ and have reflectivities $r_a$ and $r_b$ respectively.

$$r_a = \frac{\sqrt{\epsilon}-1}{\sqrt{\epsilon}+1}$$

and $$r_b = e^{-2f}$$

we may define $T \equiv \tanh f$ and write $$T = \frac{(1-r_b)}{(1+r_b)}$$

and $$\frac{1}{\sqrt{\epsilon}} = \frac{(1-r_a)}{(1+r_a)}$$

It is then possible to consider arbitrary reflectivities at $z = \pm a$, $\pm b$ by suitable choices for T and $$\frac{1}{\sqrt{\epsilon}}$$

in the range 0 to 1.

Furthermore, allow the angular frequency $\omega$ of the light waves in the cavity to be real, and $\sigma$ to assume an appropriate negative value. Now if the dimensions are chosen so that $$n(b-a) = ma\sqrt{\epsilon}$$

when $m$ and $n$ are positive integers, then it can be shown by considering the electromagnetic field in the cavity that for the preferred mode having the lowest loss $$\chi_{min.} = -\frac{T}{\sqrt{\epsilon}}$$

where $\chi = \tanh(2\pi\sigma a/c\sqrt{\epsilon})$ is a measure of the loss. For the modes having the largest losses $$\chi_{max.} = -T\sqrt{\epsilon} \quad (\epsilon T^2 < 1)$$

$$\chi_{max.} = -\frac{1}{T\sqrt{\epsilon}} \quad (\epsilon T^2 > 1)$$

Let the quantity $$R = \frac{\chi}{\chi_{min.}}$$

be called the "discrimination ratio." Then $R_{max}$ is equal to $\epsilon$ or to $$\frac{1}{T^2}$$

whichever is smaller. It follows that, for optimum discrimination among the modes in the cavity $r_b$ should be equal to or greater than $r_a$.

Consider a specific example in which $m/n = \frac{1}{5}$, $\sqrt{\epsilon} = 10$ and $T = .02$. The corresponding reflectivities are $r_a = .82$ and $r_b = .96$. The loss of the preferred mode is $$\chi_{min} = -.002$$

while $$\chi_{max} = -.2$$

Figure 4A:
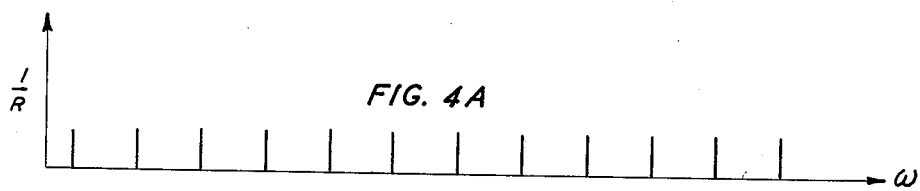
FIG. 4a illustrates the mode spectrum of a two-surface optical cavity resonator.

In FIG. 4 the mode spectrum of the arrangement depicted in FIG. 3 is compared with that of an arrangement having no reflective surfaces at $\pm b$. The loss in the two-surface case (FIG. 4a) is identical for all modes:

$$\chi = -\frac{1}{\sqrt{\epsilon}} = -.1$$

Figure 4B:
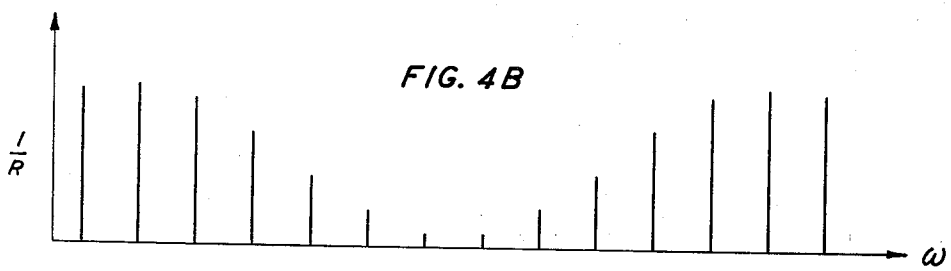
FIG. 4b illustrates the mode spectrum of a four-surface optical cavity resonator.

The heights of the spectrum lines in FIG. 4 are proportional to $$\frac{1}{R}$$

and indicate the relative Q of each mode. The heights in FIG. 4b are exaggerated with respect to those in FIG. 4a, so that the two spectra cannot be directly compared. The heights of the lines in FIG. 4b indicate that the losses in selected modes are increased relative to those in preferred modes. It should also be noted that there are more modes in the fundamental period in FIG. 4b than in FIG. 4a. This reflects the fact that the overall optical cavity is longer in the four-surface device than in the two-surface arrangement. However, the additional modes are among the lossy ones and do not interfere with the desired result. The periodicity in the mode spectrum shown in FIG. 4b is the result of choosing $$\frac{n}{m}$$

an integer. Periodicity is destroyed by making $$\frac{n}{m}$$

nonintegral, but there is still a preferred mode with minimum loss. The greatest advantage in discrimination against unwanted modes is obtained by setting $$b-a \cong (2\Delta\nu)^{-1}$$

where $\Delta\nu$ is the half-width of the fluorescent emission line of the active medium.

Although the invention has been described with particular reference to specific embodiments, many modifications and variations are possible and may be made by those skilled in the art without departing from its scope and spirit.

What is claimed is:

1. An optical maser comprising an elongated optical cavity resonator having flat parallel reflective end members, at least one flat reflective interior member within said resonator spaced axially from said end members and parallel thereto, said interior member and at least one of said end members being partially transmissive to light wave energy at the operating frequency, at least one end member of said resonator having a reflectivity substantially as great as that of the facing interior reflective member of said resonator, said end and interior members defining a plurality of gaps in said cavity resonator, at least one gap in said resonator having an optical length substantially equal to the reciprocal of the width of the fluorescent emission line in wave numbers, and active maser medium disposed in at least one of said gaps, and means for applying pump wave energy to said medium for producing a population inversion therein.

2. An optical maser comprising an elongated optical cavity resonator having flat parallel reflective end members, first and second flat reflective interior members within said resonator spaced axially from said end members and parallel thereto, said interior members and at least one of said end members being partially transmissive to light wave energy at the operating frequency, each end reflective members having a reflectivity substantially as great as that of the nearest interior reflective member, said end and interior members defining three gaps in said resonator, an active maser medium disposed in the center gap of said resonator, the two empty gaps having lengths substantially equal to the reciprocal of the width of the fluorescent emission line in wave numbers, and means for applying pump wave energy to said medium for producing a population inversion therein.

3. An optical maser comprising an elongated optical cavity resonator having flat parallel end reflective members, a single flat reflective interior member within said resonator spaced axially from said end members and parallel thereto, said interior member and at least one of said end members being partially transmissive to light wave energy at the operating frequency, the end member of said resonator which defines one end of an empty gap therein having a reflectivity substantially as great as that of said interior reflective member, said end and interior members defining two gaps in said resonator, an active maser medium disposed in one of said gaps, the empty gap in said resonator having a length substantially equal to the reciprocal of the width of the fluorescent emission line in wave numbers, and means for applying pump wave energy to said medium for producing a population inversion therein.

References Cited in the file of this patent

Jenkins et al.: Fundamentals of Optics, 2nd ed. (1950), pages 269, 272–3.

Morgan: Introduction to Geometrical and Physical Optics (1953), page 232.

Boyd et al.: Bell System Technical Journal, vol. 40, No. 2, (March 1961), pages 491, 494, 504 and 505.

Fox et al.: Bell System Technical Journal, vol. 40, No. 2, (March 1961), pages 481 to 483.